Oct. 7, 1924.

N. W. HART

FLUID DISPENSING MACHINE

Filed Jan. 11, 1923    5 Sheets-Sheet 1

1,510,842

Inventor
Norton W. Hart.
By
Attorney

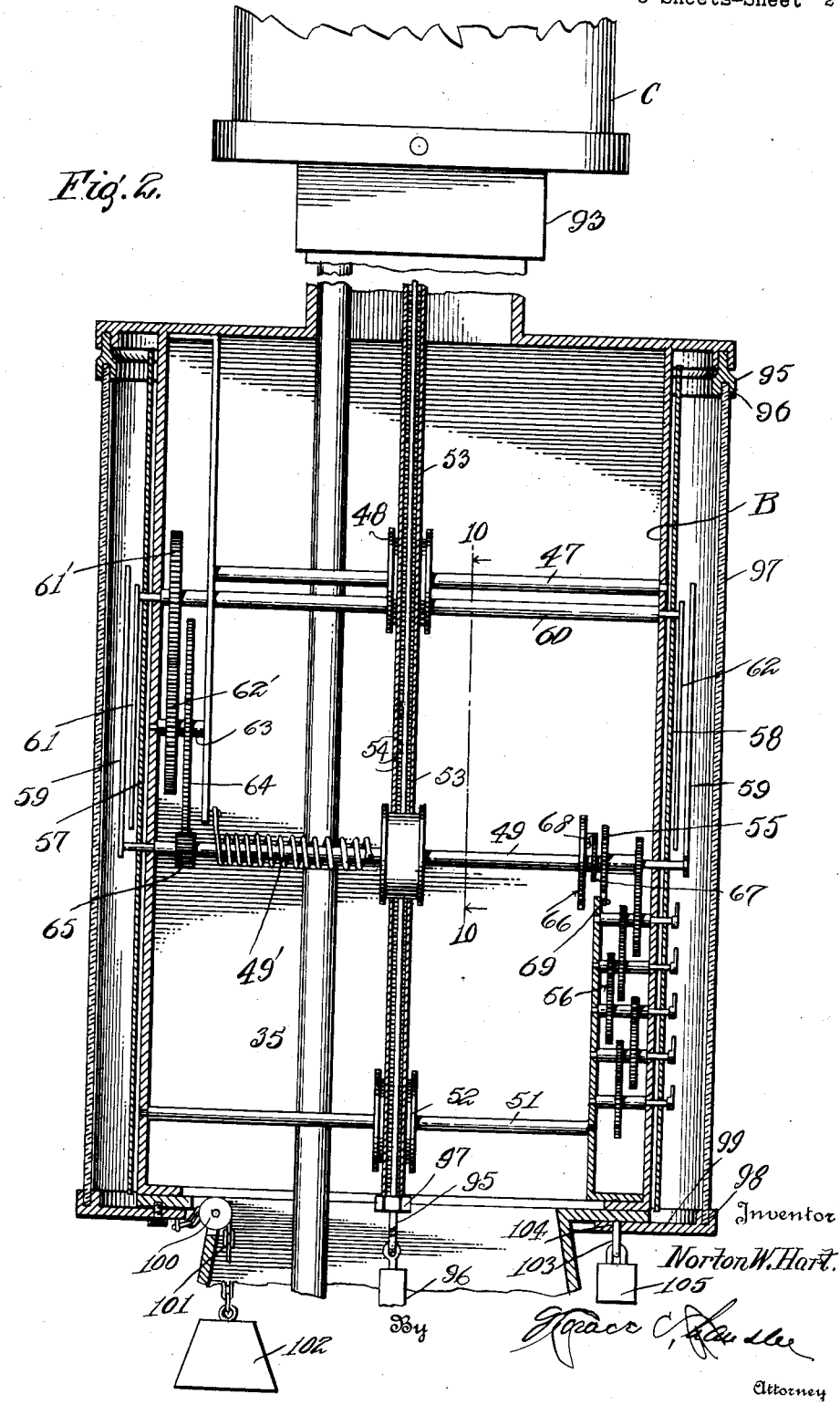

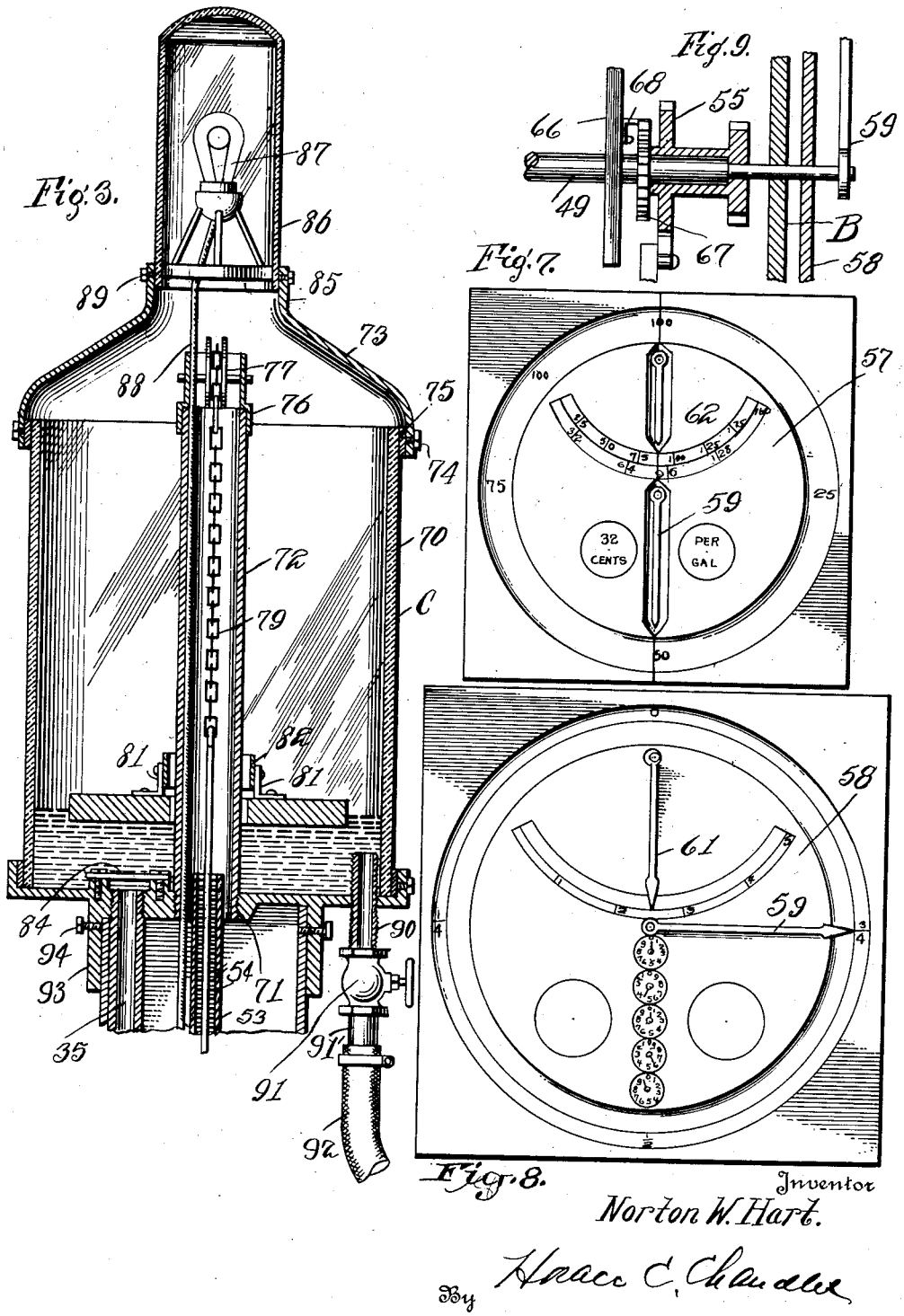

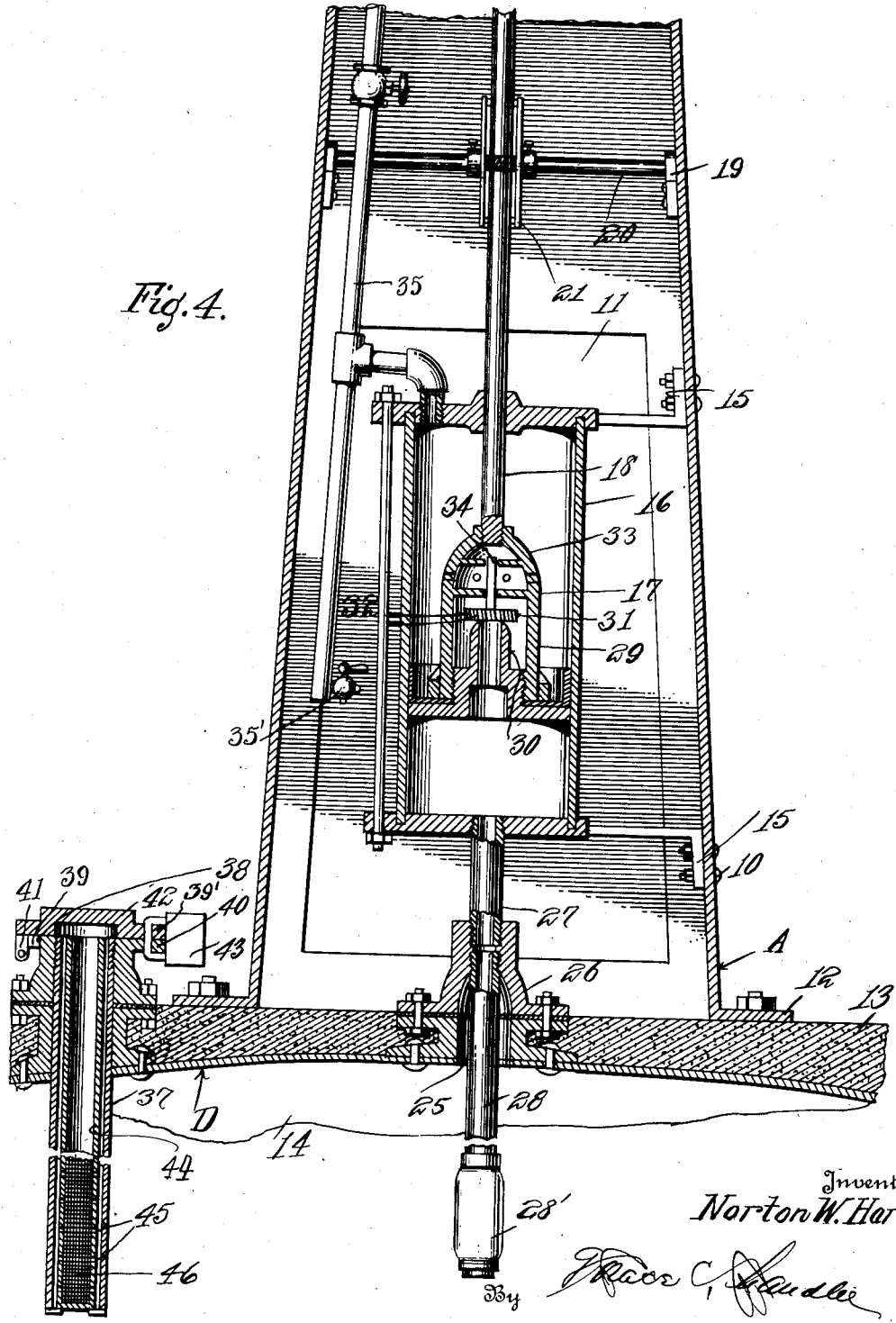

Oct. 7, 1924.
N. W. HART
1,510,842
FLUID DISPENSING MACHINE
Filed Jan. 11, 1923    5 Sheets-Sheet 5
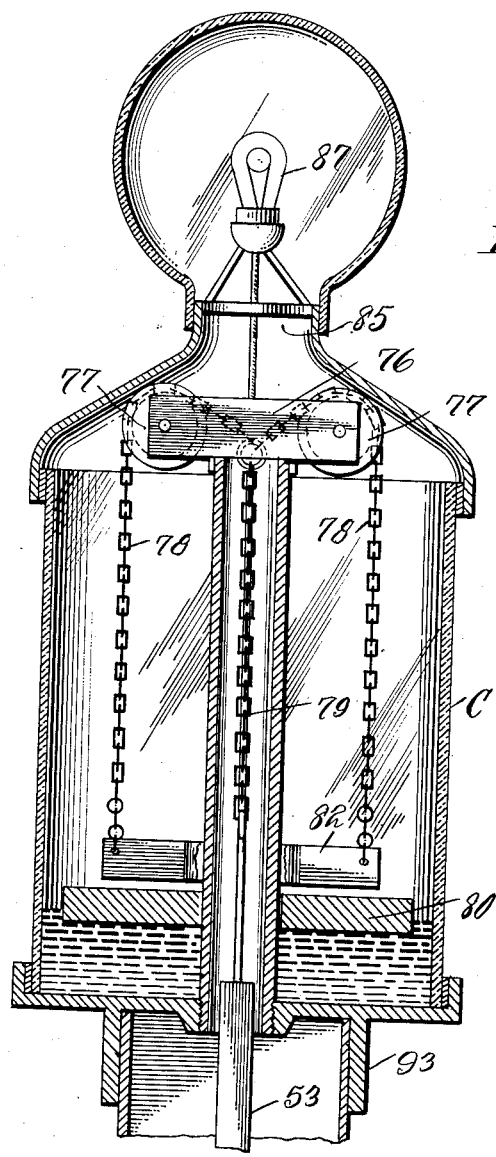
Fig. 6.
Inventor
Norton W. Hart.
Attorney Patented Oct. 7, 1924.

1,510,842

UNITED STATES PATENT OFFICE.

NORTON W. HART, OF WARRENTON, GEORGIA.

FLUID-DISPENSING MACHINE.

Application filed January 11, 1923. Serial No. 612,148.

*To all whom it may concern:*

Be it known that I, NORTON W. HART, a citizen of the United States, residing at Warrenton, in the county of Warren, State of Georgia, have invented certain new and useful Improvements in Fluid-Dispensing Machines; and I do hereby declare the following to be a full, clear, and exact description of the invention, such as will enable others skilled in the art to which it appertains to make and use the same.

This invention relates to new and useful improvements in dispensing machines, and particularly to machines for dispensing gasoline, oils, and the like.

One object of the invention is to provide a machine of this character which accurately measure the fluid to be dispensed, so that the customer will know that he is getting the amount paid for.

Another object is to provide a mechanism, in a dispensing device of this character, which will accurately register the amount of fluid as it is pumped from the sunken tank into the dispensing globe mounted on the stand.

Another object is to provide a device of this character which includes a mechanism for registering the amount of fluid dispensed, said mechanism operating the register and recorder as the fluid is being pumped into the dispensing globe, to show the amount of a single purchase, and also the total of sales, and to restore the registering means back to zero, without disturbing the recording means.

Another object is to provide a device of this character in which the registering dials may be quickly and easily changed to accord with the change in the price of the fluid per gallon.

A further object is to provide a novel and improved pumping mechanism, in a device of the class described, which will accurately draw the desired amount of fluid from the reservoir, and wherein is included a self-grinding valve.

Other objects and advantages will be apparent from the following description when taken in connection with the accompanying drawings.

In the drawings:

Figure 2 is an enlarged vertical central sectional view through the upper or dial portion of the device.

Figure 3 is an enlarged vertical sectional view through the dispensing globe, showing the float, and the inlet and outlet means.

Figure 4 is an enlarged vertical sectional view through the pump and a portion of the sunken tank.

Figure 6 is a vertical longitudinal sectional view through the dispensing globe, taken in a plane at right angles to that of Figure 3.

Figure 7 is a detail view of one of the supplemental dials.

Figure 8 is a detail of the dial of Figure 1.

Figure 9 is a detail sectional view of the counter mechanism.

Figure 5:
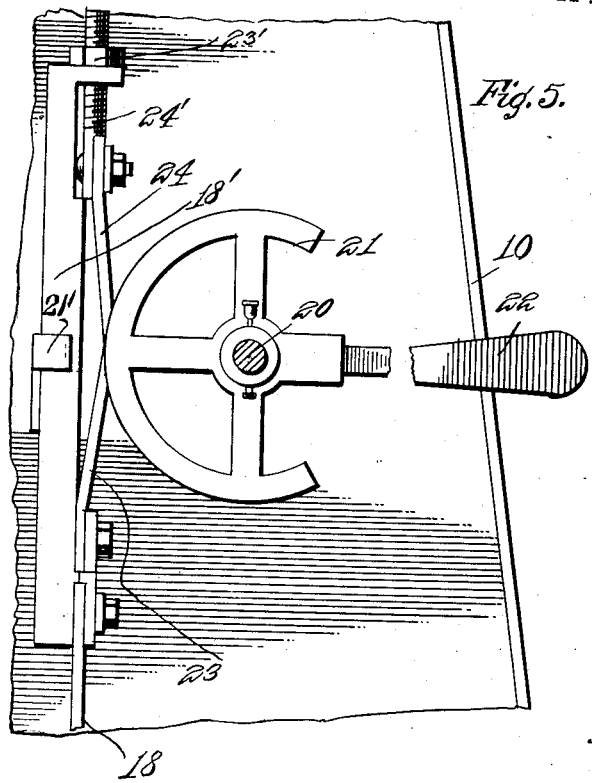
Figure 5 is an enlarged sectional detail view of the upper portion of the pump rod, and the means for operating the same.
Figure 1:
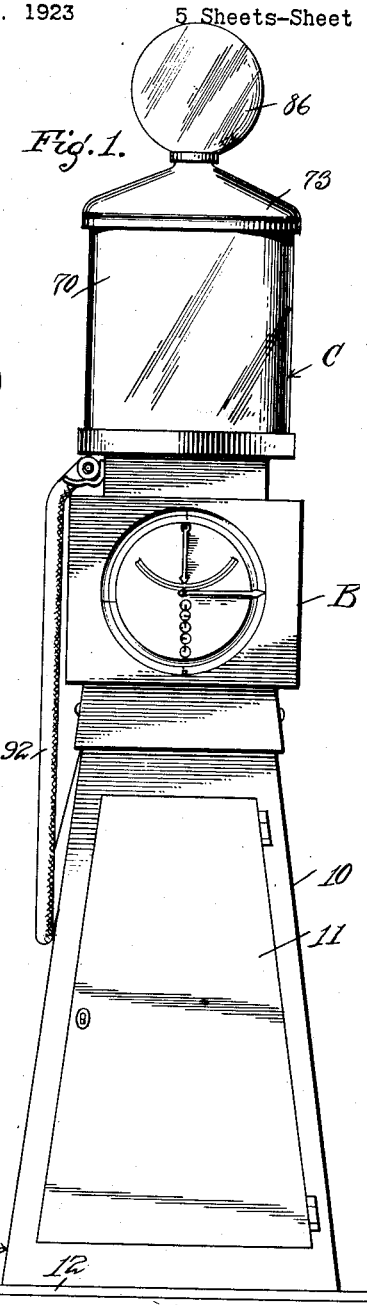
Figure 1 is an elevation of the fluid dispensing device forming the subject-matter of the present invention.
Figure 10:
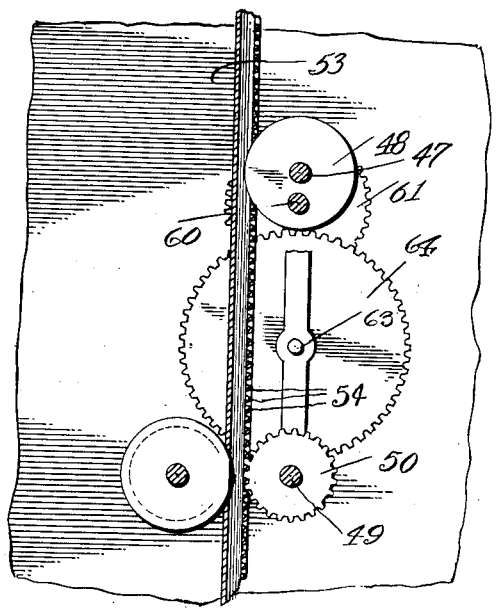
Figure 10 is a vertical sectional view on the line 10—10 of Figure 2.

Referring particularly to the accompanying drawings, the device includes the base portion A, the registering and recording section B, mounted on the base A, the dispensing globe C, on the section B, and the sunken tank D.

The base portion A includes an upwardly tapering housing 10 having access doors 11, in the opposite sides thereof. This base is provided with an attaching flange 12, which is adapted to be bolted to any suitable ground foundation, such as the cement foundation 13, said foundation being preferably located over or adjacent the well 14, in which is located the sunken tank or reservoir D. Within the housing 10, and secured to the brackets 15, which are mounted on the side wall thereof, is a pump cylinder 16, the said brackets serving as the heads of the cylinder and being suitably packed at the joints therewith. Reciprocating within the cylinder is a valved piston 17, to which is connected a piston rod 18. Mounted on the housing 10 is a frame 19 which supports a transverse shaft 20, and rockably mounted on this shaft is a segmental pulley 21, to which is connected a suitable hand lever 22, and which hand lever projects in position to be grasped to rock the pulley. Connected to the upper end of the piston rod 18 is a bar 18'. Connected to the lower end of the bar 18' are the two straps 23, the same extending upwardly and being connected to the upper end portion of the segmental pulley 21. A similar strap 24 is secured to a bolt 24' in the upper end of the bar 18', and extends downwardly where it is secured to the lower end portion of the segmental pulley, whereby, when the pulley is rocked the straps will exert pulling force on the piston rod to cause the same to reciprocate and move the piston longitudinally within the cylinder. The upper end of the bolt has a nut 23' by means of which the slack in the strap 24 may be taken up. A guide 21' is carried by the housing 10, and engages with the said bar 18'. In the upper side of the tank D there is formed an opening 25, and secured to the tank, around the opening, is a casing or union 26, within which is screwed the pipes 27 and 28, the former extending upwardly and being connected with the lower end of the pump cylinder 16, while the other end extends downwardly to a point adjacent the bottom of the tank, where it is provided with a check valve 28'. Connected to the lower end of the rod 18 is a casing 29, and extending upwardly, within the casing, is a tubular member 30, the space between the said member, and the side wall of the casing serves to retain foreign matter which settles from the gasoline, while the upper end of the tubular member forms a seat for the valve 31, which valve rests thereon. The peripheral face of the body of the valve 31 is formed with a series of obliquely extending ribs 33, which, when the gasoline is flowing through the casing, or when the valve is returning to its seat, will be acted upon by the gasoline so that the valve body will rotate, thereby providing a self-grinding valve and seat. Suitable guides 33 are formed in the upper portion of the valve casing 29 to guide the stem 34, of the valve, in its opening and closing movements. Extending vertically in the housing 10 is a pipe 35, the lower portion of which is arranged at the side of the cylinder 16, while the upper end is connected to the bottom of the globe C. In the lower end of this pipe there is disposed a drain cock 35', for drawing off the sediment which collects in the lower end of the pipe. The side of the pipe is connected to the upper end of the cylinder, as seen in Figure 4. The portion of the pipe 35, between its point of connection with the cylinder 16, and the drain cock 35', forms a trap. Connected to the upper side of the tank D is a filling pipe 37, and formed around the upper end of this pipe is a flange 38, the same having a pair of oppositely extending apertured lugs 39 and 40. Engaged in the opening of the lug 39 is a T-head 41 of the closure cap 42, while the other side of the cap has an apertured lug 39' registering with the apertured lug 40 for the reception of the shackle of the padlock 43. Within the pipe 37 is disposed a smaller pipe 44 having a plurality of openings 45 therein, and secured within the said pipe is a cylinder of fine gauze of wire, for the purpose of straining the gasoline as it is poured into the tank D from the supply wagon. The pipe 44, and the gauze 46, are readily removable for purpose of cleaning.

Mounted in the upper portion of the section B, and extending transversely thereof, is a shaft 47, and fixed on the center of this shaft is a grooved wheel 48. Extending through the intermediate portion of the section B is a shaft 49, and fixed on the intermediate portion thereof is a gear 50. In the lower end of the section B is a transverse shaft 51, carrying intermediate its length a grooved wheel 52. Slidable vertically in the center of the section B is a rack bar 53, the same being in the form of an angular tube having openings 54 throughout its length, in one side, receiving the teeth of the gear 50, while the back of the rack bar rides in the grooved wheels 48 and 52, to maintain the proper engagement of the rack with the gear. The gear shaft 49 has a gear 55 on one end, inwardly of the side of the section B, which forms one of a train of gears 56, and which gears operate indicating hands to indicate the amount of gasoline dispensed by the machine. On opposite sides of the housing, above the indicating hands, are the dials 57 and 58, through the centers of which are disposed the ends of the shaft 49. On opposite ends of the shaft 49, and in position to traverse marks on the dials, are the hands 59. Disposed through the section B, adjacent the shaft 47, is a shaft 60, the ends of which extend through the upper portions of the dials 57 and 58, and carry hands 61 and 62, for traversing other portions of the dials. It will be noted that the hands 59 traverse markings around the peripheries of the dials, while the hands 61 and 62 traverse arcs within the dials, representing prices per unit of measurement, and total cost. On one end of the shaft 60 is a gear 61' which meshes with a gear 62' carried by a stub shaft 63, mounted in the adjacent side of the section B. Also carried by the shaft 63 is a larger gear 64 which meshes with a small gear 65, on the shaft 49. Thus, by reason of the ratio of the gears 61, 62, and 64, the movement of the hands 59, around the dial, in a complete revolution, will cause the hand 61 to traverse a part of the graduated arc. It will be noted that the dials are constructed and arranged so that they may be easily and quickly inserted and removed, to permit the substitution of other dials, which have different prices per units of measurement. This is especially useful when the market prices change.

On the shaft 49, inwardly of the gear 55, there is secured a disk 66. Loosely mounted on the shaft 49, close to the disk 66, is a ratchet wheel 67, which is engaged by a spring pressed pawl 68, carried by the disk, so that as the shaft 49 is rotated in one direction, the pawl will be engaged and the ratchet wheel turned, and when the shaft is rotated in the opposite direction the wheel, being loose on the shaft, will remain stationary, by means of the second pawl 69 on the frame. Associated with the ratchet and rotatable therewith, is a toothed member 55 which forms part of a transfer mechanism for the train of registering gears. From the the above it will be seen that as the rack bar 53 moves in one direction, it rotates the shaft 49 without affecting the ratchet 67, but when it moves in the opposite direction the ratchet causes a transferring throughout the counter or registering mechanism. A buffer spring 49' is carried by shaft 49.

Mounted on the top of the registering mechanism housing is a transparent tank 70, having an opening 71 in the center of its bottom, and secured in this opening is the vertically extending tube 72, the upper end of which lies in a plane coincident with the upper end of the tank. The upper end of the tank has an upwardly tapering cap 73 secured thereon by means of the screws 74, and provided with a suitable packing 75, to prevent leakage of gasoline. The tube 72 is open-ended, and mounted on the upper end of the tube is a transversely extending support 76, and rotatable in each end of the support is a grooved wheel 77, over which run the chains 78. The inner ends of these chains are connected to the upper end of a single chain 79 which extends downwardly through the center of the rack bar 53, and is formed with a hook 95 on which is supended a weight 96. On the hook 95 is disposed a nut 97 which bears against the lower end of the rack bar for the purpose of adjusting the rack bar vertically, when the registering mechanism becomes out of proper adjustment. Weights of different sizes are adapted to be suspended on the hook 95 to insure proper counterbalance. A float body 80 is disposed in the tank and receives the tube 72 therethrough. On the float, at diametrically opposite sides of the tube 72, are the brackets 81, and mounted for rocking movement on these brackets, and surrounding the tube, is a rocker 82, to the opposite ends of which are connected the other ends of the chains 78, respectively. By this arrangement of the chains, and the rocking movement of the rocker 82, the direct pull of the rack bar 53 is maintained, and any tendency of the float to cant to one side or the other, with the inrush of gasoline into the bottom of the tank, through the inlet pipe 35, will be counteracted. Mounted on the bottom of the tank, just above the pipe 35, and arranged to be adjusted to different heights thereabove, is a perforated baffle plate 84, the same serving to prevent uneven contact of the inrushing gasoline with the bottom of the float. The upper or apex end of the cap 73 has an opening 85, and secured to this end, and covering the opening, is a transparent globe 86, within which is disposed the electric light lamp 87, receiving current through the wires which pass upwardly through the conduit 88, which conduit is disposed in the central tube 72. This globe 86 is secured in place by means of the screws 89, thus rendering it removable.

Extending vertically through one side of the bottom of the tank 70 is a nipple 90, provided with a globe valve 91, which has a suitable coupling 91', to which is connected the filling hose 92, and by means of which hose the gasoline is conveyed to the tanks of automobiles. When the float falls low enough to contact with the baffle plate 84, the level of the gasoline will be at the upper end of the nipple 90, whereupon the gasoline will cease to flow from the tank.

The bottom of the tank 70 is formed with a depending flange 93 in which are disposed screws 94, and by means of which the tank is secured on the upper end of the housing 11.

While I have shown the tank 70 as made from glass, I wish it understood that the tank may be made from metal, and provided with one or more glass sight openings.

Encircling the upper end of the section B is a ring 95 having in its lower face a groove 96 which receives the upper edge of the glass casing 97, which completely encloses the said section B. The lower end of the glass cylinder 97 is secured within the groove 98 in the horizontal flat ring 99, which is disposed below the bottom of the said section. On the housing 10, is mounted a grooved wheel 100, and engaged over this wheel, and having its upper end connected with the ring 99, is a chain 101, while the other end of the chain depends within the housing and carries a counterbalancing weight 102. At the opposite side of the bottom of the section B there is a depending staple 103 which enters an opening 104 in the ring 99, and is arranged to receive the hasp or shackle of a padlock 105, whereby the glass casing can be locked in closed position. When it is desired to gain access to the hands and dials the padlock is removed, and then the glass casing moved down against the force of the weight 102, and when released the weight will return the casing to elevated position.

What is claimed is:

1. In a measuring device having a float responsive to the movement of liquid in the device, a rack bar connected with and operable by the float, a registering mechanism including a shaft having a gear rotatable with the shaft in one direction and independently thereof in the opposite direction, and a flexible connection between the float and the rack bar.

2. In a measuring device having a float responsive to the movement of the level of liquid in the device, a registering mechanism including a shaft having a gear rotatable with the shaft in one direction and independently in the opposite direction, a rack bar engaged with a second gear on the shaft, a tubular support for the float, and flexible connections between the float and rack bar and engaged on the tubular support.

3. In a measuring device having a float responsive to the movement of the level of liquid in the device, a registering mechanism including a shaft having a gear rotating the shaft in one direction, a rack bar engaged with the gear, a support on which the float is slidable, rotary elements on the support, and flexible elements connected with the rack bar and the float and extending through the support and over said rotary elements.

4. In a measuring device having a float responsive to the movement of the level of liquid in the device, a registering mechanism including a shaft having a gear rotatable with the shaft in one direction, a tubular support for the float, a rack bar engaged with the gear, pulleys on the support, a rockable frame on the float, and flexible elements connected with the rack bar and with the rockable frame and extending through the tubular support.

5. In a measuring device having a float responsive to the movement of the level of liquid in the device, a registering mechanism including a shaft having a gear rotatable with the shaft in one direction, a tubular support for the float, pulleys on the upper end of the support, a rockable frame on the float, a rack bar, a chain extending through the tubular support and connected with the rack bar, and chains carried by the other end of the rockable frame, said second chains being engaged on said pulleys.

In testimony whereof, I affix my signature, in the presence of two witnesses.

NORTON W. HART.

Witnesses:
G. P. LANGFORD,
GENE ENGLISH.